G. W. BLAIR.
Method of Flaring and Crimping Glassware.

No. 201,589. Patented March 26, 1878.

WITNESSES.
R. E. Henderson
James D. Kay

INVENTOR.
George W. Blair
by Bakewell & Ken
Attorneys

N. PETERS, PHOTO-LITHOGRAPHER, WASHINGTON, D. C.

UNITED STATES PATENT OFFICE.

GEORGE W. BLAIR, OF PITTSBURG, PENNSYLVANIA.

IMPROVEMENT IN METHODS OF FLARING AND CRIMPING GLASSWARE.

Specification forming part of Letters Patent No. 201,589, dated March 26, 1878; application filed March 28, 1876.

*To all whom it may concern:*

Be it known that I, GEORGE W. BLAIR, of Pittsburg, in the county of Allegheny and State of Pennsylvania, have invented a new and useful Improvement in Methods of Flaring and Crimping Glassware; and I do hereby declare the following to be a full, clear, and exact description thereof, reference being had to the accompanying drawing, which forms a part of this specification, and in which—

Figure 1:
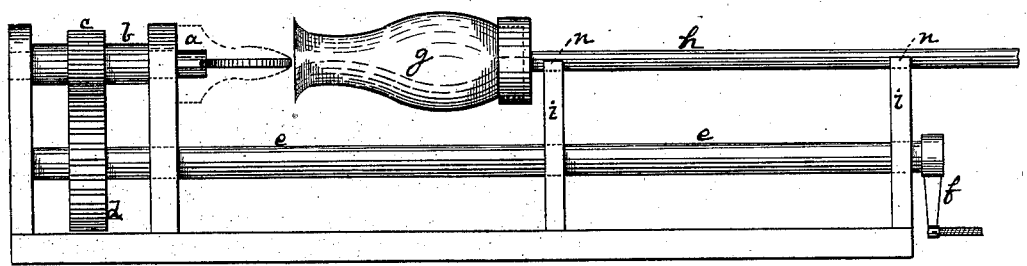
Figure 2:
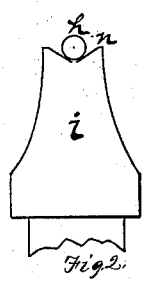
Figure 3:
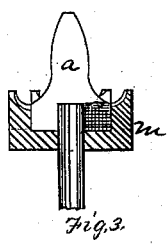
Figure 4:
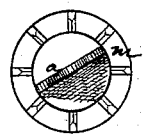
Figure 5:
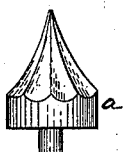
Figure 7:
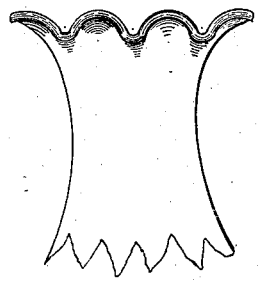
Figure 6:
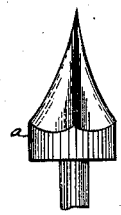

Figure 1 is a side view of a machine by means of which my invention may be carried into practice, the flaring-tool being shown in two positions. Fig. 2 is a view of one of the centering-standards. Figs. 3 and 4 are views of a combined flaring and crimping tool. Figs. 5 and 6 are modified forms of the flaring-tool. Fig. 7 is a view of the flared and crimped end of a lamp-chimney, the same simply flared being shown in Fig. 1.

Like letters of reference indicate like parts in each.

In the manufacture of flared glassware I have found that the use of a plain conical flaring-tool is objectionable, for the reason that the plastic glass sticks to it and becomes "crizzled"—that is, full of minute surface cracks. I have also discovered that the use of a tapered or tapering tool or former having two or more edges, ribs, or blades, if either former or article is rotated, the other being stationary, entirely obviates this difficulty. This result is due to freeing the glass from close contact with the entire surface of the mandrel while in a state of tension, which does not exist in the case of a rotating tapered tool having suitable flaring-edges, for then the frictional contact between the swiftly-moving surfaces of the tool and glass is not continuous on any part.

My invention consists in flaring hollow glass articles having an open end, without external pressure, by pressing them over a tapered former having two or more converging ribs or edges while either former or article is rotated upon a fixed center, the other being stationary; also, in flaring and crimping hollow glass articles by pressing the open end over a tapering tool or former having ribs or edges against a crimping device, while either article or former is rotated on a fixed center, the other being stationary; also, in a tapering flaring tool or former having ribs or edges combined with a crimper, said tool or crimper being capable of rotation while the other is still.

In Fig. 1 the tapering flaring tool or former $a$ is a single blade, and hence has two edges. This tool, when rotated swiftly, forms, practically, a coniform tool; but the only surface in contact with the glass is that of the edges or corners. This is also the case with the tools shown by Figs. 5 and 6. The tool $a$ is mounted on the shaft $b$, and rotated by means of the friction-wheels $c$ $d$, shaft $e$, and crank $f$. Any other suitable means of rotating the former or tool $a$ may be used for that purpose.

The lamp-chimney $g$, or other article to be flared, is reheated at the end to be flared, presented to the rotating former by means of a tool or snap, $h$, which is properly centered in the standards $i$ with the flaring-former, so that, when advanced, the flaring-former shall enter the open end and impart a symmetrical flare to it. The true axial position of the snap $h$ with relation to the former $a$ will be preserved, because it is guided in a fixed plane by the standards $i$ when pushed toward the flaring-tool. In case the latter is stationary and the snap carrying the glass is revolved, the result is the same. The snap then, lying in the standard-rests $n$, preserves a fixed or determined center, the axis of which coincides with that of the flaring device. The snap may be revolved in the standards by power or by hand, or it may have a rotating end, which carries the glass, its stock being stationary.

The devices shown in Figs. 5 and 6 operate in the same way, the difference being one of form only. The article may then be crimped by pressing it against a crimper; or it may be both flared and crimped by a single operation by the tool shown in Figs. 3 and 4, in which, in the rear of the former $a$, is a crimper, $m$, mounted on the stem of the former. When the former is designed to rotate, the crimper is stationary, and vice versa, so that if the non-rotating article is forced over the rotating former, it will encounter and be crimped on a stationary crimper; and if, rotating, it is forced over a stationary flaring-tool, it will encounter and be crimped on a crimper which, being free to rotate, travels with it.

It will be seen that the article is flared or shaped without any external device or former pressing upon or operating against the outer surface. This is necessary for the successful operation of my invention, and is one of its chief and most advantageous features. The flare of the finished article is the result of the unhampered stretch of the plastic glass over the inner forming-edges, and presents clear external surfaces, wholly free from "crizzles."

The advantages of these methods are flaring without "crizzling," and flaring and crimping without fluting.

This invention is applicable to all hollow open-end glassware, and imparts a true symmetrical flare to the same, whether the taper of the working-edges of the flaring-tool is true or on a curve.

I am aware that in the patent of M. H. Collins, No. 68,416, of September 3, 1867, a curved disk has been suggested, in combination with a wire former or skeleton-frame, for turning a lip or flange outward on a cylinder, and do not claim such devices; but,

Having thus described my invention, I claim and desire to secure by Letters Patent—

1. The method of flaring without external pressure, by reheating the end to be flared, and then pressing it over a tapering former having two or more convergent ribs or edges, while either former or article is rotated upon a fixed center, the other being stationary, substantially as specified.

2. The method of flaring and crimping hollow glassware at one operation, by pressing the open end over a tapering tool or former having ribs or edges against a crimping device, while either article or former is rotated upon a fixed center, the other being still.

3. A tapering flaring tool or former having ribs or edges, combined with a crimper, said tool or crimper being capable of rotation while the other is still.

In testimony whereof I, the said GEORGE W. BLAIR, have hereunto set my hand.

GEO. W. BLAIR.

Witnesses:
L. C. FITLER,
T. B. KERR.